United States Patent
Matsuzaki et al.

(10) Patent No.: US 10,541,423 B2
(45) Date of Patent: Jan. 21, 2020

(54) ELECTRODE MIXTURE LAYER COMPOSITION FOR NONAQUEOUS ELECTROLYTE SECONDARY BATTERY, MANUFACTURING METHOD THEREOF AND USE THEREFOR

(71) Applicant: TOAGOSEI CO., LTD., Tokyo (JP)

(72) Inventors: Hideo Matsuzaki, Nagoya (JP); Naohiko Saito, Nagoya (JP); Morikatsu Matsunaga, Nagoya (JP); Shinya Kumagai, Nagoya (JP)

(73) Assignee: TOAGOSEI CO. LTD., Tokyo (JP)

( * ) Notice: Subject to any disclaimer, the term of this patent is extended or adjusted under 35 U.S.C. 154(b) by 137 days.

(21) Appl. No.: 15/561,391

(22) PCT Filed: Mar. 29, 2016

(86) PCT No.: PCT/JP2016/060156
§ 371 (c)(1),
(2) Date: Sep. 25, 2017

(87) PCT Pub. No.: WO2016/158964
PCT Pub. Date: Oct. 6, 2016

(65) Prior Publication Data
US 2018/0108917 A1 Apr. 19, 2018

(30) Foreign Application Priority Data
Mar. 30, 2015 (JP) ................... 2015-069477

(51) Int. Cl.
*H01M 4/86* (2006.01)
*H01M 10/0525* (2010.01)
*C25B 1/24* (2006.01)
*C25B 11/04* (2006.01)
*H01M 10/0566* (2010.01)

(52) U.S. Cl.
CPC ............ *H01M 4/8652* (2013.01); *C25B 1/24* (2013.01); *C25B 11/0484* (2013.01); *H01M 4/8615* (2013.01); *H01M 10/0525* (2013.01); *H01M 10/0566* (2013.01)

(58) Field of Classification Search
CPC .. H01M 4/8652; H01M 4/0404; H01M 4/622; H01M 10/0525; H01M 4/8615; H01M 4/139; H01M 4/13; H01M 10/0566; C25B 11/0484; C25B 1/24; C08F 220/06
See application file for complete search history.

(56) References Cited

U.S. PATENT DOCUMENTS

2015/0287993 A1* 10/2015 Komaba .............. C08G 18/025
429/217

FOREIGN PATENT DOCUMENTS

| JP | 2000-294247 A | 10/2000 |
| JP | 2010-132723 A | 6/2010 |
| JP | 2013-168323 A | 8/2013 |
| JP | 2015-003998 A | 1/2015 |
| JP | 2015-018776 A | 1/2015 |
| JP | 2015-023015 A | 2/2015 |
| WO | 2014/065407 A1 | 5/2014 |
| WO | 2015/008626 A1 | 1/2015 |

OTHER PUBLICATIONS

English machine translation of Haruta JP2013-168323. (Year: 2013).*
Jul. 5, 2016 Search Report issued in International Patent Application No. PCT/JP2016/060156.
Jul. 5, 2016 Written Opinion issued in International Patent Application No. PCT/JP2016/060156.

* cited by examiner

*Primary Examiner* — Lisa S Park
(74) *Attorney, Agent, or Firm* — Oliff PLC

(57) ABSTRACT

An electrode mixture layer composition for a nonaqueous electrolyte secondary battery contains an active material, water and a binder. The binder contains a crosslinked polymer of a monomer component including an ethylenically unsaturated carboxylic acid monomer, and a salt thereof. The crosslinked polymer is a polymer that is crosslinked with allyl methacrylate, and an amount of the allyl methacrylate used is 0.1 to 2.0 parts by weight relative to total 100 parts by weight of non-crosslinking monomers, and a content of the crosslinked polymer and salt thereof is 0.5% to 5.0% by weight of the active material.

15 Claims, No Drawings

ELECTRODE MIXTURE LAYER COMPOSITION FOR NONAQUEOUS ELECTROLYTE SECONDARY BATTERY, MANUFACTURING METHOD THEREOF AND USE THEREFOR

TECHNICAL FIELD

The present teachings relate to an electrode mixture layer composition for a nonaqueous electrolyte secondary battery, which is usable for, for instance, a lithium-ion secondary battery, a manufacturing method thereof, a nonaqueous electrolyte secondary battery electrode, and nonaqueous electrolyte secondary battery obtained using this electrode mixture layer composition for a nonaqueous electrolyte secondary battery.

BACKGROUND ART

Lithium-ion secondary batteries are well known as examples of nonaqueous electrolyte secondary batteries. Lithium-ion secondary batteries are popular in smart phones, tablets, notebook computers and other mobile devices because they have superior energy density, output density, charge-discharge cycle characteristics and the like in comparison with other secondary batteries such as lead storage batteries, and they have contributed to reducing the size and weight and increasing the performance of such devices. However, in terms of output, time required for charging and the like, they have not yet reached the level of performance required of secondary batteries for use in electrical vehicles and hybrid vehicles (vehicle-mounted secondary batteries). Therefore, research is being conducted to improve the charge-discharge characteristics at high current densities (high-rate characteristics) with the aim of increasing the output and reducing the charging times of nonaqueous electrolyte secondary batteries. Also, since high durability is also required for vehicle-mounted applications, compatibility with cycle characteristics is required.

Nonaqueous electrolyte secondary batteries are composed of a pair of electrodes disposed with a separator in between and a nonaqueous electrolyte solution. Each electrode is formed of a collector and a mixture layer formed on the surface of the collector, and the mixture layer is formed by, for instance, coating and drying an electrode mixture layer composition (slurry) containing an active material, a binder and the like on the collector.

Meanwhile, in recent years, aqueous electrode mixture layer compositions have also been in increased demand for reasons such as environmental protection and cost reduction. In the context of lithium-ion secondary batteries, aqueous binders using styrene butadiene rubber (SBR) and carboxymethyl cellulose (CMC) are being used in electrode mixture layer compositions for negative electrodes that use carbon materials such as graphite as the active material. However, further improvements are needed to accommodate the advanced high-rate characteristics and cycle characteristics required for vehicle-mounted applications. Meanwhile, solvent-based binders of polyvinylidene fluoride (PVDF) and the like using organic solvents such as N-methyl-2-pyrrolidone (NMP) are preferred for the positive electrodes of lithium-ion secondary batteries, and no aqueous binder has been proposed that fulfills the requirements discussed above.

Carbon-based materials including active materials such as graphite and hard carbon (HC) and conductive aids such as Ketjen black (KC) and acetylene black (AB) are widely used as components of lithium-ion secondary batteries. These carbon-based materials generally have poor wettability to aqueous media, so to obtain a uniform electrode mixture layer composition with excellent dispersion stability, an aqueous binder having an excellent dispersion stabilizing effect on these carbon-based materials is desired. As shown below, an aqueous binder containing a cross inked polyacrylic acid has been proposed as an aqueous binder that is applicable to a lithium-ion secondary battery electrode.

Patent Literature 1 discloses an acrylic acid polymer crosslinked with a polyalkenyl ether as a binder for forming a negative electrode coating of a lithium-ion secondary battery. Patent Literature 2 describes how an excellent capacity retention rate can be obtained without destruction of the electrode structure even when using an active material containing silicon by using as a binder a polymer comprising a polyacrylic acid crosslinked with a specific crosslinking agent.

Crosslinked polyacrylic acids are also widely used as water-soluble thickeners, and Patent Literature 3 discloses an unsaturated carboxylic acid-based crosslinked polymer obtained by including a specific crosslinking agent.

Patent Literature 1 Japanese Patent Application Publication No. 2000-294247
Patent Literature 2 International Publication No. 2014-065407
Patent Literature 3 Japanese Patent Application Publication No. 2010-132723

SUMMARY OF INVENTION

Technical Problem

A binder composition containing an acrylic acid polymer crosslinked with a polyalkenyl polyether is disclosed in examples of Patent Literature 1. However, since this binder composition containing an acrylic acid polymer is highly viscous, which makes it difficult to ensure uniformity when the binder composition is mixed with an active material or the like and kneaded to prepare a mixture layer composition, there have been concerns that this could adversely affect battery characteristics. Moreover, the detailed description of the invention in Patent Literature 1 discloses the problem that if a compounding ratio of the acrylic acid polymer in the binder exceeds 95% by weight, it covers particle surfaces of the carbon material, reducing conductivity and inhibiting movement of lithium ions.

The examples of Patent Literature 2 disclose binders consisting of polyacrylic acids crosslinked with differing types and amounts of crosslinking agents, and also describe the viscosities of 1% by weight of slurries of these crosslinked polyacrylic acids at 0.6 rpm or 60 rpm (Table 3, etc.). However, the binder compositions containing crosslinked polyacrylic acids for which specific 60 rpm viscosity values are given have low viscosity, raising concerns about the binding properties and the dispersion stability of the active materials and the like. On the other hand, the binder compositions containing crosslinked polyacrylic acids for which specific 0.6 rpm viscosity values are given have high viscosity, which could reduce uniformity and adversely affect the electrode characteristics when kneading a mixture layer composition.

Although Patent Literature 3 shows a water-soluble crosslinked polymer having good thickening ability, it neither describes nor suggests applying this to an electrode mixture layer composition for a nonaqueous electrolyte secondary battery.

Moreover, none of Patent Literatures 1 to 3 includes any description related to high-rate characteristics.

Under these circumstances, it is an object of the present teachings to provide an electrode mixture layer composition for a nonaqueous electrolyte secondary battery, containing an aqueous binder and capable of providing both high-rate characteristics and other electrode characteristics such as durability (cycle characteristics), as well as a manufacturing method therefor. Another object is to provide a nonaqueous electrolyte secondary battery electrode and a nonaqueous electrolyte secondary battery obtained using this aqueous electrode mixture layer composition.

Solution to Technical Problem

To achieve advanced high-rate characteristics, it is generally desirable to minimize an amount of the binder, which acts as a resistance component. Thus, there is demand for a binder that can stably disperse the active material, conductive aid and the like even when used in a small quantity, that provides strong binding force between particles of the active material and between the active material and the collector (and thus strong adhesion between the mixture layer and the collector), and that yields an electrode with superior durability.

There is also demand for a binder that does not resist penetration and escape of lithium ions even when the binder is present on the active material surface. That is, such a binder preferably has small resistance (interface resistance) associated with penetration of lithium ions into the active material and escape of lithium ions from the active material because it has an excellent lithium ion desolvation effect and lithium ion conductivity.

The inventors discovered as a result of earnest researches aimed at solving these problems that a binder containing a crosslinked polymer of an ethylenically unsaturated carboxylic acid monomer crosslinked with allyl methacrylate and a salt thereof of can improve the high-rate characteristics because it has excellent binding properties even when used in a small amount. Moreover, it was also discovered that because this binder has excellent binding properties, it is effective for improving the durability (cycle characteristics) of the electrode. Furthermore, because a mixture layer composition containing this binder has suitable viscosity for electrode preparation, it can yield a nonaqueous electrolyte secondary battery electrode with a uniform mixture layer and good electrode characteristics. The present teachings were obtained based on these findings.

The present teachings are as follows.

[1] An electrode mixture layer composition for a nonaqueous electrolyte secondary battery, containing an active material, water and a binder, wherein the binder contains a crosslinked polymer of a monomer component including an ethylenically unsaturated carboxylic acid monomer and a salt thereof;

the crosslinked polymer is a polymer that is crosslinked with allyl methacrylate, and an amount of the allyl methacrylate used is 0.1 to 2.0 parts by weight relative to total 100 parts by weight of non-crosslinking monomers, and a content of the crosslinked polymer and salt thereof is 0.5% to 5.0% by weight of the active material.

[2] The electrode mixture layer composition for a nonaqueous electrolyte secondary battery according to [1] above, wherein the crosslinked polymer is a polymer that is crosslinked with allyl methacrylate and a polyfunctional allyl compound, and an amount of the allyl methacrylate and polyfunctional allyl compound is 0.1 to 3.0 parts by weight relative to total 100 parts by weight of the non-crosslinking monomers.

[3] The electrode mixture layer composition for a nonaqueous electrolyte secondary battery according to [1] or [2] above, wherein a degree of neutralization of the crosslinked polymer is 20 to 100 mol %.

[4] A method of manufacturing an electrode mixture layer composition for a nonaqueous electrolyte secondary battery, the method including:

precipitation-polymerizing a monomer component including an ethylenically unsaturated carboxylic acid monomer and allyl methacrylate in an aqueous medium to obtain a crosslinked polymer; and mixing the same with an active material and water to thereby manufacture an electrode mixture layer composition for a nonaqueous electrolyte secondary battery.

[5] A nonaqueous electrolyte secondary battery electrode comprising a mixture layer formed from the electrode mixture layer composition for a nonaqueous electrolyte secondary battery according to any of [1] to [4] above on a surface of a collector.

[6] A nonaqueous electrolyte secondary battery provided with the nonaqueous electrolyte secondary battery electrode according to [5] above, together with a separator and a nonaqueous electrolyte solution.

Advantageous Effects of Invention

The binder used in the electrode mixture layer composition for a nonaqueous electrolyte secondary battery of the present teachings has excellent binding properties even when used in a small amount. It is therefore possible to reduce a binder content of the mixture layer composition, and to obtain an electrode with excellent high-rate characteristics and durability (cycle characteristics). Moreover, because the electrode mixture layer composition for a nonaqueous electrolyte secondary battery of the present teachings has a viscosity suited to electrode preparation, it can yield a nonaqueous electrolyte secondary battery electrode having a uniform mixture layer and good electrode characteristics.

The present teachings will be explained in detail below. In this Description, "(meth)acrylic" means acrylic and/or methacrylic, and "(meth)acrylate" means acrylate and/or methacrylate. A "(meth)acryloyl group" means an acryloyl group and/or a methacryloyl group.

An electrode mixture layer composition for a nonaqueous electrolyte secondary battery of the present teachings comprises a binder containing a crosslinked polymer of a monomer component including an ethylenically unsaturated carboxylic acid monomer and salt thereof, together with an active material and water. This composition may be in a form of a slurry that can be coated on a collector, or may be prepared as a wet powder and pressed onto the collector surface. The nonaqueous electrolyte secondary battery electrode of the teachings can be obtained by forming a mixture layer of this composition on a surface of a copper foil, aluminum foil or other collector.

The various components and the like of the electrode mixture layer composition for a nonaqueous electrolyte secondary battery of the present teachings, a method of manufacturing the same, and the nonaqueous electrolyte secondary battery electrode and nonaqueous electrolyte secondary battery obtained using this composition will be explained in detail below.

(Binder)

The binder of the teachings contains a crosslinked polymer of a monomer component including an ethylenically unsaturated carboxylic acid monomer and salt thereof. As examples of the ethylenically unsaturated carboxylic acid monomer, specific compounds include vinyl monomers having carboxyl groups, such as (meth)acrylic acid, crotonic acid, itaconic acid, maleic acid, maleic anhydride, fumaric acid, itaconic acid monobutyl, maleic acid monobutyl and cyclohexanedicarboxylic acid and (partially) alkali neutralized products of these, and one of these alone or a combination of two or more may be used. Of those given above, $C_{3-5}$ ethylenically unsaturated carboxylic acid monomers such as (meth)acrylic acid, crotonic acid, itaconic acid, maleic acid, maleic anhydride and fumaric acid and salts of these are desirable for achieving a long primary chain length of the obtained polymer and good binding force of the binder, and acrylic acid is especially desirable.

Examples of salt types include alkali metal salts such as lithium, sodium and potassium; alkali earth metal salts such as calcium and barium salts; other metal salts such as magnesium and aluminum salts; and ammonium salts, organic amine salts and the like. Of these, alkali metal salts and magnesium salts are desirable for preventing adverse effects on the battery characteristics, and alkali metal salts are especially desirable.

In addition to the ethylenically unsaturated carboxylic acid monomer, another non-crosslinking monomer may also be included as a monomer component to the extent that this does not detract from the effects of the teachings. Examples of other non-crosslinking monomers include (meth)acrylic acid alkyl esters, (meth)acrylic acid hydroxyalkyl esters, aromatic vinyl compounds, amino group-containing vinyl compounds, amido group-containing vinyl compounds, sulfonic acid group-containing vinyl compounds, polyoxyalkylene group-containing vinyl compounds, alkoxyl group-containing vinyl compounds and the like. One of these compounds alone or a combination of two or more may be used.

As examples of the (meth)acrylic acid alkyl esters, specific compounds include (meth)acrylic acid ester compounds having linear, branched or cyclic alkyl groups, such as methyl (meth)acrylate, ethyl (meth)acrylate, n-propyl (meth)acrylate, isopropyl (meth)acrylate, n-butyl (meth) acrylate, isobutyl (meth)acrylate, sec-butyl (meth)acrylate, tert-butyl (meth)acrylate, n-pentyl (meth)acrylate, isoamyl (meth)acrylate, hexyl (meth)acrylate, cyclohexyl (meth) acrylate, 2-ethylhexyl (meth)acrylate and octyl (meth)acrylate.

As examples of the (meth)acrylic hydroxyalkyl esters, specific compounds include 2-hydroxyethyl (meth)acrylate, 2-hydroxypropyl (meth)acrylate, 4-hydroxybutyl (meth) acrylate, and 2-hydroxyethyl (meth)acrylate ε-caprolactone adduct and the like.

Examples of the aromatic vinyl compounds include styrene, 2-methylstyrene, 3-methylstyrene, 4-methylstyrene, α-methylstyrene, 2,4-dimethylstyrene, 2,4-diisopropylstyrene, 4-tert-butylstyrene, tert-butoxystyrene, vinyl toluene, vinyl naphthalene, halogenated styrene, styrene sulfonic acid, α-methylstyrene sulfonic acid and the like.

Examples of the amino group-containing vinyl compounds include dimethyl aminomethyl (meth)acrylate, 2-diethyl aminomethyl (meth)acrylate, 2-dimethyl aminoethyl (meth)acrylate, 2-diethyl aminoethyl (meth)acrylate, 2-(di-n-propylamino)ethyl (meth)acrylate, 2-dimethyl aminopropyl (meth)acrylate, 2-diethyl aminopropyl (meth)acrylate, 2-(di-n-propylamino)propyl (meth)acrylate, 3-dimethyl aminopropyl (meth)acrylate, 3-diethyl aminopropyl (meth) acrylate, 3-(di-n-propylamino)propyl (meth)acrylate and the like.

Examples of the amido group-containing vinyl compounds include (meth)acrylamide, N,N-dimethyl (meth) acrylamide, N,N-dimethylaminopropyl (meth)acrylamide, N-isopropylacrylamide, N-t-butylacrylamide and the like.

Examples of the sulfonic acid group-containing vinyl compounds include methallylsulfonic acid, (meth)acrylamido-2-methyl-2-propanesulfonic acid and the like.

Examples of the polyoxyalkylene group-containing vinyl compounds include (meth)acrylic acid esters of alcohols having polyoxyethylene and/or polyoxypropylene groups and the like.

Examples of the alkoxyl group-containing vinyl compounds include 2-methoxyethyl (meth)acrylate, 2-ethoxyethyl (meth)acrylate, 2-(n-propoxy)ethyl (meth)acrylate, 2-(n-butoxy)ethyl (meth)acrylate, 3-methoxypropyl (meth) acrylate, 3-ethoxypropyl (meth)acrylate, 2-(n-propoxy)propyl (meth)acrylate, 2-(n-butoxy)propyl (meth)acrylate and the like.

A ratio of the ethylenically unsaturated carboxylic acid monomer of a total amount of non-crosslinking monomers is in a range of preferably 50% to 100% by weight, or more preferably 70% to 100/o by weight, or still more preferably 90% to 100% by weight, or yet more preferably 95% to 100% by weight. When the polymer has carboxyl groups, it has an excellent lithium ion desolvation effect and ion conductivity, resulting in an electrode with low resistance and excellent high-rate characteristics. If the ratio of the ethylenically unsaturated carboxylic acid monomer of the total amount of non-crosslinking monomers is at least 50% by weight, the effects of the carboxyl groups can be sufficiently imparted.

In addition to the non-crosslinking monomers described above, a crosslinking monomer is also used as a monomer component, and in the present teachings allyl methacrylate must be used as a crosslinking monomer. Given 100 parts by weight as the total amount of the non-crosslinking monomers, an amount of allyl methacrylate used is 0.1 to 2.0 parts by weight, or preferably 0.2 to 1.5 parts by weight, or more preferably 0.3 to 1.0 part by weight. If the amount of the allyl methacrylate is less than 0.1 parts by weight, binding properties of the electrode mixture layer composition may be insufficient. If it exceeds 2.0 parts by weight, on the other hand, swellability by water may be insufficient because a resulting crosslinked polymer is over-crosslinked, and dispersion stability and binding properties of the electrode mixture layer composition may also be unsatisfactory.

Polyfunctional polymerizable monomers other than allyl methacrylate and crosslinking monomers having self-crosslinkable crosslinking functional groups such as hydrolyzable sylil groups may also be included as crosslinking monomers to an extent that they do not detract from the effects of the teachings.

These polyfunctional polymerizable monomers are compounds having two or more polymerizable functional groups such as (meth)acryloyl or alkenyl groups in the molecule, such as polyfunctional (meth)acrylate compounds, polyfunctional alkenyl compounds, and, for instance, compounds, other than allyl methacrylate, which have both (meth)acryloyl and alkenyl groups. One of these compounds alone or a combination of two or more may be used. Of these, a polyfunctional alkenyl compound is preferred for ease of obtaining a uniform crosslinked structure. Using allyl methacrylate and a polyfunctional alkenyl compound together as crosslinking monomers is desirable for obtaining an electrode mixture layer composition with excellent swellability and extremely good dispersion stability in particular.

Examples of polyfunctional (meth)acrylate compounds include di(meth)acrylates of dihydric alcohols, such as ethylene glycol di(meth)acrylate, propylene glycol di(meth)acrylate, 1,6-hexanediol di(meth)acrylate, polyethylene glycol di(meth)acrylate and polypropylene glycol di(meth)acrylate; tri(meth)acrylates of trihydric and higher polyhydric alcohols, such as trimethylolpropane tri(meth)acrylate, trimethylolpropane ethylene oxide modified tri(meth)acrylate, glycerin tri(meth)acrylate, pentaerythritol tri(meth)acrylate and pentaerythritol tetra(meth)acrylate; poly(meth)acrylates such as tetra(meth)acrylate.

Examples of polyfunctional alkenyl compounds include polyfunctional allyl ether compounds such as trimethylolpropane diallyl ether, pentaerythritol diallyl ether, pentaerythritol triallyl ether, tetraallyl oxyethane and polyallyl saccharose; polyfunctional allyl compounds such as diallyl phthalate; and polyfunctional vinyl compounds such as divinyl benzene and the like.

Examples of compounds other than allyl methacrylate having both (meth)acryloyl and alkenyl groups include allyl acrylate, isopropenyl (meth)acrylate, butenyl (meth)acrylate, pentenyl (meth)acrylate, 2-(2-vinyloxyethoxy)ethyl (meth)acrylate and the like.

Examples of other polyfunctional polymerizable monomers include bisamides such as methylene bisacrylamide and hydroxyethylene bisacrylamide.

Specific examples of the monomers having self-crosslinkable functional groups include vinyl monomers containing hydrolysable silyl groups, and N-methylol (meth)acrylamide, N-methoxyalkyl (meth)acrylate and the like. One of these compounds or a mixture of two or more may be used.

The vinyl monomers containing hydrolysable silyl groups are not particularly limited as long as they are vinyl monomers having at least one hydrolysable silyl group. Examples include vinyl silanes such as vinyl trimethoxysilane, vinyl triethoxysilane, vinyl methyl dimethoxysilane and vinyl dimethyl methoxysilane; acrylic acid esters containing silyl groups, such as trimethoxysilylpropyl acrylate, triethoxysilylpropyl acrylate and methyl dimethoxysilylpropyl acrylate; methacrylic acid esters containing silyl groups, such as trimethoxysilylpropyl methacrylate, triethoxysilylpropyl methacrylate, methyl dimethoxysilylpropyl methacrylate and dimethyl methoxysilylpropyl methacrylate; vinyl ethers containing silyl groups, such as trimethoxysilylpropyl vinyl ether, and vinyl esters containing silyl groups, such as vinyl trimethoxysilyl undecanoate and the like.

The degree of crosslinking of the crosslinked polymer of the teachings is relatively low, and the amount of the crosslinking monomer used is preferably 0.1 to 3.0 parts by weight, or more preferably 0.4 to 2.0 parts by weight relative to total 100 parts by weight of the monomers (non-crosslinking monomers) other than the crosslinking monomers. If the amount of the crosslinking monomer is within this range, it is possible to obtain a binder with excellent binding force.

In addition to the aforementioned crosslinking monomer, the crosslinked polymer of the teachings may also be crosslinked with a compound having two or more functional groups capable of reacting with carboxyl groups introduced into the polymer.

Compounds such as the following are examples of compounds having two or more functional groups capable of reacting with carboxyl groups.

i) Compounds forming covalent bonds with carboxyl groups, such as epoxy groups, carbodiimide groups and oxazoline groups.

ii) Compounds having $Ca^+$, $Mg^{2+}$ and the like that form ion bonds with carboxyl groups.

iii) Compounds having $Zn^{2+}$, $Al^{3+}$, $Fe^{3+}$ and the like that form coordinate bonds with carboxyl groups.

The viscosity of the crosslinked polymer of the teachings is preferably in the range of 1,000 to 40,000 mPa·s when the polymer is adjusted to a degree of neutralization of 90 mol % and made into a 0.5% by weight aqueous dispersion. This viscosity here is measured with a B type viscometer (rotor speed 20 rpm) at a liquid temperature of 25° C. The viscosity of the 0.5% by weight aqueous dispersion is more preferably in the range of 2,000 to 40,000 mPa·s, or still more preferably in the range of 3,000 to 40,000 mPa·s, or most preferably in the range of 3,000 to 35,000 mPa·s. If the viscosity is in the range of 1,000 to 40,000 mPa·s, it is possible to obtain a mixture layer composition with excellent uniformity and dispersion stability of the active material.

If the crosslinked polymer is unneutralized or has a degree of neutralization of less than 90 mol %, viscosity is measured after the polymer has been neutralized in an aqueous medium with an alkali compound to a degree of neutralization of 90 mol %, and made into an 0.5% by weight aqueous dispersion. When the degree of neutralization of the crosslinked polymer exceeds 90 mol %, the viscosity is measured in a 0.5% by weight aqueous dispersion either at that degree of neutralization or after the polymer has been neutralized to a degree of neutralization of 90 mol % by addition of a suitable acid such as sulfuric acid.

In general, a toughness of a crosslinked polymer is greater the greater the length of the polymer chain (primary chain), which not only allows for stronger binding properties but also increases the viscosity of the aqueous dispersion. Moreover, a crosslinked polymer (salt) obtained by applying a relatively small amount of crosslinking to a polymer with a long primary chain length swells in water to become a microgel. The viscosity of the aqueous dispersion rises as the degree of crosslinking increases, but if there is too much crosslinking the viscosity of the aqueous dispersion tends to decline because the water-swelling ability of the crosslinked polymer is limited. In the electrode mixture layer composition of the invention, the effects of increased viscosity and dispersion stabilization are achieved through the interactions of this microgel. The interactions of the microgel differ depending on the degree of water swelling of the microgel and the strength of the microgel, which are in turn controlled by the degree of crosslinking of the crosslinked polymer. If the degree of crosslinking is too low the microgel is insufficiently strong, and the dispersion stabilization effect and binding properties may be insufficient. If the degree of crosslinking is too high, on the other hand, the microgel does not swell sufficiently, and the dispersion stabilization effect and binding properties may be insufficient. That is, a micro crosslinked polymer obtained by applying a suitable degree of crosslinking to a polymer with a sufficiently long primary chain length is desirable as the crosslinked polymer.

As discussed above, the crosslinked polymer of the invention uses allyl methacrylate as a crosslinking monomer. When a polyfunctional methacrylate compound such as dimethacrylate is used as a crosslinking monomer, the resulting crosslinked polymer tends to have insufficient water-swelling properties because intramolecular crosslinking predominates. When a polyfunctional allyl compound having only allyl groups as unsaturated groups is used, however, it is necessary to use a large quantity of the polyfunctional allyl compound in order to obtain the desired degree of crosslinking because allyl groups have low copolymerizability. In this case, the binding properties may be insufficient because the primary chain length of the crosslinked polymer obtained by the degenerative chain transfer reaction is shorter. The amount of unreacted residual crosslinking monomer is also greater, and crosslinking may continue when the product is dried after polymerization without removing unreacted components, resulting in excess crosslinking. Allyl methacrylate is incorporated efficiently into the polymer chain by methacryloyl groups, and because intramolecular crosslinking also progresses via the allyl groups, it is possible to efficiently obtain a polymer with a long primary chain length and a suitable degree of crosslinking.

The crosslinked polymer of the present invention is preferably used in the form of a salt in which the acid groups including carboxyl groups derived from the ethylenically unsaturated carboxylic acid monomer have been neutralized so that the degree of neutralization is 20 to 100 mol %. The degree of neutralization is more preferably 50 to 100 mol %, or still more preferably 60 to 95 mol %. A degree of neutralization of 20 mol % or higher is desirable for obtaining good water swellability and a dispersion stabilization effect.

The amount of the crosslinked polymer and salt thereof used in the electrode mixture layer composition of the teachings is 0.5% to 5.0% by weight of the total amount of the active material. This amount is preferably 1.0% to 5.0% by weight, or more preferably 1.5% to 5.0% by weight, or still more preferably 2.0 to 5.0 parts by weight. If the amount of the crosslinked polymer and salt thereof is less than 0.5% by weight, sufficient binding properties may not be obtained. The dispersion stability of the active material and the like may also be insufficient, thereby reducing the uniformity of the formed mixture layer. If the amount of the crosslinked polymer and salt thereof exceeds 5.0% by weight, on the other hand, the electrode mixture layer composition may be too viscous, detracting from the coating properties on the collector. Coating lumps and irregularities may occur in the mixture layer as a result, adversely affecting the electrode characteristics. There is also a risk of increased interface resistance and poor high-rate characteristics.

If the crosslinked polymer and salt thereof are used in the amount described above, the resulting composition has excellent dispersion stability, and it is possible to obtain a mixture layer with extremely strong adhesiveness on the collector, thereby improving the durability of the battery. Moreover, because the amount of 0.5% to 5.0% by weight of the active material is small and because the polymer has carboxy anions, there is little interface resistance, resulting in an electrode with excellent high-rate characteristics.

(Method for Manufacturing Crosslinked Polymer and Salt Thereof)

A known polymerization method such as solution polymerization, precipitation polymerization, suspension polymerization or reverse-phase emulsion polymerization may be used for manufacturing of the crosslinked polymer of the teachings, but precipitation polymerization is preferred for purposes of efficiently manufacturing a polymer with a long primary chain length and a suitable degree of crosslinking.

Precipitation polymerization is a method of manufacturing a polymer by performing a polymerization reaction in a solvent that dissolves the starting material (unsaturated monomer) but effectively does not dissolve the resulting polymer. As polymerization progresses, the polymer particles grow larger by aggregation and polymer growth, resulting in a dispersion of polymer particles of micrometers to tens of micrometers in size formed by aggregation of primary particles of tens of nanometers to hundreds of nanometers in size. A dispersion stabilizer may also be used to control the polymer particle size. Moreover, after polymerization the reaction solution may be subjected to filtration, centrifugation or the like to separate the polymer particles from the solvent.

In the case of precipitation polymerization, a solvent selected from water and various organic solvents and the like may be used as the polymerization solvent depending on types of monomers used and the like. A solvent with a small chain transfer constant is preferred for obtaining a polymer with a longer primary chain length.

When the ethylenically unsaturated carboxylic acid monomer is polymerized in an unneutralized state, specific examples of polymerization solvents include benzene, ethyl acetate, dichloroethane, n-hexane, cyclohexane, n-heptane and the like, and one of these alone or a combination of two or more may be used.

When polymerizing a (partial) neutralization product of the ethylenically unsaturated carboxylic acid monomer, a water-soluble solvent such as methanol, t-butyl alcohol, acetone or tetrahydrofuran may be used, and one of these alone or a mixture of two or more may be used. Mixed solvents of these with water may also be used. In the present invention, a water-soluble solvent is one with a solubility of more than 10 g/100 ml in water at 20° C.

In order to obtain a polymer providing excellent dispersion stability of the active material, preferably a (partial) neutralization product of the ethylenically unsaturated carboxylic acid monomer is precipitation polymerized in an aqueous medium comprising water and a water-soluble solvent. In this case, precipitation and aggregation of the polymer can be controlled by adjusting the amount of water according to the type and amount of the monomers used, to thereby ensure the dispersion stability of the precipitated particles and stably complete polymerization. The ratio of the water-soluble solvent contained in the aqueous medium is preferably 50% to 100% by weight, or more preferably 70% to 100% by weight, or still more preferably 90% to 100% by weight of the aqueous medium.

A known polymerization initiator such as an azo compound, organic peroxide or inorganic peroxide may be used as a polymerization initiator, without any particular restrictions. The conditions of use may be adjusted to achieve a suitable amount of radical generation, using a known method such as thermal initiation, redox initiation using a reducing agent, UV initiation or the like. To obtain a crosslinked polymer with a long primary chain length, the conditions are preferably set so as to reduce the amount of radical generation within an allowable range of manufacturing time.

Examples of the azo compound include 2,2'-azobis(2,4-dimethylvaleronitrile), 2,2'-azobis(N-butyl-2-methylpropionamide), 2-(tert-butylazo)-2-cyanopropane, 2,2'-azobis(2,4,4-trimethylpentane) and 2,2'-azobis(2-methylpropane), and one of these or a combination of two or more may be used.

Examples of the organic peroxide include 2,2-bis(4,4-di-t-butylperoxycyclohexyl) propane (product name "Pertetra A" by NOF Corporation), 1,1-di(t-hexylperoxy) cyclohexane (product name "Perhexa HC" by NOF Corporation), 1,1-di(t-butylperoxy) cyclohexane (product name "Perhexa C" by NOF Corporation), n-butyl-4,4-di(t-butylperoxy) valerate (product name "Perhexa V" by NOF Corporation), 2,2-di(t-butylperoxy)butane (product name "Perhexa 22" by NOF Corporation), t-butylhydroperoxide (product name "Perbutyl H" by NOF Corporation), cumene hydroperoxide (product name "Percumyl H" by NOF Corporation), 1,1,3,3-tetramethylbutyl hydroperoxide (product name "Peroeta H" by NOF Corporation), t-butylcumyl peroxide (product name "Perbutyl C" by NOF Corporation), di-t-butyl peroxide (product name "Perbutyl D" by NOF Corporation), di-t-hexyl peroxide (product name "Perhexyl D" by NOF Corporation), di(3,5,5-trimethylhexanoyl) peroxide (product name "Peroyl 355" by NOF Corporation), dilauroyl peroxide (product name "Peroyl L" by NOF Corporation), bis(4-t-butylcyclohexyl) peroxydicarbonate (product name "Peroyl TCP" by NOF Corporation), di-2-ethylhexyl peroxydicarbonate (product name "Peroyl OPP" by NOF Corporation), di-sec-butyl peroxydicarbonate (product name "Peroyl SBP" by NOF Corporation), cumyl peroxyneodecanoate (product name "Percumyl ND" by NOF Corporation), 1,1,3,3-tetramethylbutyl peroxyneodecanoate (product name "Perocta ND" by NOF Corporation), t-hexyl peroxyneodecaate (product name "Perhexyl ND" by NOF Corporation), t-butyl peroxyneodecanoate (product name "Perbutyl ND" by NOF Corporation), t-butyl peroxyneoheçptanoate (product name "Perbutyl NHP" by NOF Corporation), t-hexyl peroxypivalate (product name "Perhexyl PV" by NOF Corporation), t-butyl peroxypivalate (product name "Perbutyl PV" by NOF Corporation), 2,5-dimethyl-2,5-di(2-ethylhexanoyl) hexane (product name "Perhexa 250" by NOF Corporation), 1,1,3,3-tetramethylbutylperoxy-2-ethylhexanoate (product name "Perocta O" by NOF Corporation), t-hexylperoxy-2-ethylhexanoate (product name "Perhexyl O" by NOF Corporation), t-butylperoxy-2-ethylhexanoate (product name "Perbutyl O" by NOF Corporation), t-butyl peroxylaurate (product name "Perbutyl L" by NOF Corporation), t-butyl peroxy-3,5,5-trimethylhexanoate (product name "Perbutyl 355" by NOF Corporation), t-hexylperoxyisopropyl monocarbonate (product name "Perhexyl I" by NOF Corporation), t-butylperoxyisopropyl monocarbonate (product name "Perbutyl I" by NOF Corporation), t-butyl-oxy-2-ethyl hexyl monocarbonate (product name "Perbutyl E" by NOF Corporation), t-butyl peroxyacetate (product name "Perbutyl A" by NOF Corporation), t-hexyl peroxybenzoate (product name "Perhexyl Z" by NOF Corporation) and t-butyl peroxybenzoate (product name "Perbutyl Z" by NOF Corporation) and the like. One of these or a combination of two or more may be used.

Examples of the inorganic peroxide include potassium persulfate, sodium persulfate and ammonium persulfate.

When using a redox initiator, sodium sulfite, sodium thiosulfate, sodium formaldehyde sulfoxylate, ascorbic acid, sulfite gas ($SO_2$), ferrous sulfate or the like can be used as the reducing agent.

The preferred amount of the polymerization initiator used is 0.001 to 2 parts by weight, or more preferably 0.005 to 1 part by weight, or still more preferably 0.01 to 0.1 parts by weight given 100 parts by weight as the total amount of the monomer components used. If the amount of the polymerization initiator is 0.001 parts or more, the polymerization reaction can be accomplished stably, while if it is 2 parts or less it is easy to obtain a polymer with a long primary chain length.

A concentration of the monomer components during polymerization is preferably high in order to obtain a polymer with a longer primary chain length. However, because the polymerization heat becomes hard to control and a runaway polymerization reaction may occur if the concentration of the monomer components is too high, polymerization is normally performed using a monomer concentration of about 2% to 30% by weight at the start of polymerization. The monomer concentration at the start of polymerization is preferably 5% to 30% by weight, or more preferably 15% to 30% by weight, or still more preferably 20% to 30% by weight.

The polymerization temperature depends on the conditions such as the types and concentrations of the monomers used, but is preferably 0° C. to 100° C., or more preferably 20° C. to 80° C. The polymerization temperature may be constant, or may be changed during the period of the polymerization reaction. The polymerization time is preferably 1 minute to 10 hours, or more preferably 10 minutes to 5 hours, or still more preferably 30 minutes to 2 hours.

The binder of the teachings comprises a crosslinked polymer of a monomer component including the aforementioned ethylenically unsaturated carboxylic acid monomer and salt thereof but other binder components such as styrene/butadiene latex (SBR), acrylic latex and polyfluoride vinylidene latex may also be included. When another binder component is included, the amount thereof is preferably 5% or less by weight, or more preferably 2% or less by weight, or still more preferably 1% or less by weight of the active material. If the amount of the other binder component exceeds 5% by weight, resistance increases, and the high-rate characteristics may be insufficient.

(Active Material)

The electrode mixture layer composition for a nonaqueous electrolyte secondary battery of the invention contains a binder consisting of the crosslinked polymer and salt thereof, together with an active material and water.

Of the active materials described above, lithium salts of transition metal oxides are principally used as positive electrode active materials, and for example laminar rock salt-type and spinel-type lithium-containing metal oxides may be used. Specific compounds that are laminar rock salt-type positive electrode active materials include lithium cobaltate, lithium nickelate, and NCM $\{Li(Ni_x,Co_y,Mn_z), x+y+x=1\}$ and NCA $\{Li(Ni_{1-a-b}Co_aAl_b)\}$ and the like, which are referred to as ternary materials. Examples of spinel-type positive electrode active materials include lithium manganate and the like. Apart from oxides, phosphate salts, silicate salts and sulfur and the like may also be used. Examples of phosphate salts include olivine-type lithium iron phosphate and the like. One of these may be used alone as a positive electrode active material, or two or more may be combined and used as a mixture or composite.

When the laminar rock salt-type positive electrode active material is dispersed in water, the dispersion exhibits alkalinity because the lithium ions on the surface of the active material are exchanged for hydrogen ions in the water. There is thus a risk of corrosion of aluminum foil (Al) or the like, which is a general positive electrode collector material. In such cases, it is desirable to neutralize the alkali component eluted from the active material by using an unneutralized or partially neutralized crosslinked polymer as the binder. The amount of the unneutralized or partially neutralized crosslinked polymer used is preferably such that the amount of unneutralized carboxyl groups in the crosslinked polymer is equivalent to or more than the amount of alkali eluted from the active material.

Because all the positive electrode active materials have low electrical conductivity, a conductive aid is normally added and used. Examples of conductive aids include carbon materials such as carbon black, carbon nanotubes, carbon fiber, graphite fine powder, and carbon fiber. Of these, carbon black, carbon nanotubes and carbon fiber are preferred to make it easier to obtain excellent conductivity. As the carbon black, ketjen black and acetylene black are preferable. One of these conductive aids may be used alone, or a combination of two or more may be used. The amount of the conductive aid used is preferably 2% to 20% by weight, or more preferably 2% to 10% by weight of the total amount of the active material in order to achieve both conductivity and energy density.

The positive electrode active material may also be a conductive carbon material that has been surface coated.

Examples of negative electrode active materials include carbon materials, lithium metal, lithium alloys, metal oxides and the like, and one of these or a combination of two or more may be used. Of these, an active material constituted of a carbon material such as natural graphite, artificial graphite, hard carbon, and soft carbon (hereunder referred to as a "carbon-based active material") is preferred, and hard carbon or a graphite such as natural graphite or artificial graphite is more preferred. In a case of graphite, spheroidized graphite is desirable from a standpoint of battery performance, and particle size thereof is preferably in a range of 1 to 20 μm, or more preferably 5 to 15 μm.

To increase the energy density, metals, metal oxides or the like capable of occluding lithium, such as silicon and tin, are also preferably used as negative electrode active materials. Of these, silicon has a higher capacity than graphite, and an active material formed of a silicon material such as silicon, a silicon alloy or a silicon oxide such as silicon monoxide (SiO) (hereunder referred to as a "silicon-based active material") may be used. Although these silicon-based active materials have high capacities, however, a volume change accompanying charging and discharging is large. Therefore, they are preferably used in combination with the aforementioned carbon-based active materials. In this case, a large compounded amount of the silicon active material can cause breakdown of the electrode material, greatly detracting from the cycle characteristics (durability). From this perspective, when a silicon-based active material is included the amount thereof is preferably 60% by mass or less, or more preferably not 30% by mass or less of the amount of the carbon-based active material.

Because carbon-based active materials themselves have good electrical conductivity, it may not be necessary to add a conductive aid. When a conductive aid is added to further reduce resistance or the like, the amount thereof is preferably 10% by weight or less, or more preferably 5% by weight or less of the total amount of the active material from the standpoint of energy density.

When the electrode mixture layer composition for a nonaqueous electrolyte secondary battery is in slurry form, the amount of the active material used is in a range of preferably 10% to 75% by weight, or more preferably 30% to 65% by weight of the total amount of the composition. The amount of the active material of 10% by weight or more is advantageous for suppressing migration of the binder and the like, and advantageous also because of drying costs of the medium. If the amount is 75% by weight or less, on the other hand, it is possible to ensure flowability and coating performance of the composition, and to form a uniform mixture layer.

When the electrode mixture layer composition is prepared in a wet powder state, the amount of the active material used is in a range of preferably 60% to 97% by weight, or more preferably 70% to 90% by weight of the total amount of the composition.

From the standpoint of energy density, the non-volatile components other than the active material, such as the binder and conductive aid, are preferably used in the smallest amounts possible within a range where binding ability and conductivity can be secured.

(Water)

The electrode mixture layer composition for a nonaqueous electrolyte secondary battery of the present invention uses water as a medium. To adjust the properties such as drying properties of the composition, it is also possible to use a mixed solvent of water with a water-soluble organic solvent, which may be a lower alcohol such as methanol or ethanol, a carbonate such as ethylene carbonate, a ketone such as acetone, or tetrahydrofuran, N-methylpyrrolidone or the like. A percentage of water in the mixed solvent is preferably 50% by weight or more, or more preferably 70% by weight or more.

When the electrode mixture layer composition is in a coatable slurry form, the content of the media including water as a percentage of the total composition is in the range of preferably 25% to 90% by weight, or more preferably 35% to 70% by weight from the standpoint of the slurry coating properties, the energy costs required for drying, and productivity. If the electrode mixture layer composition is in a wet powder form that can be pressed, the content of the media is preferably 3% to 40% by weight or more preferably 10% to 30% by weight from the standpoint of obtaining evenness in the mixture layer after pressing.

(Electrode Mixture Layer Composition for Nonaqueous Electrolyte Secondary Battery, and Manufacturing Method Thereof)

The electrode mixture layer composition for a nonaqueous electrolyte secondary battery of the present invention has the active material, water and a binder as essential components, and is obtained by mixing each component by known methods. The methods of mixing the individual components are not particularly limited, and known methods may be used, but in a preferred method the powder components including the active material, conductive aid and binder (crosslinked polymer particle) are dry blended, and then mixed with a dispersion medium such as water and dispersed and kneaded.

When the electrode mixture layer composition is obtained in slurry form, it is preferably refined into a slurry without dispersion defects or agglomeration. The mixing method may be one using a known mixer such as a planetary mixer, thin film swirling mixer or self-revolving mixer, and a thin film swirling mixer is preferred for obtaining a good dispersed state in a short time. When a thin film swirling mixer is used, pre-dispersion is preferably performed in advance with a disperser or other stirring devices.

The viscosity of the slurry is in a range of preferably 500 to 100,000 mPa·s, or more preferably 1,000 to 50,000 mPa·s (B type viscosity at 60 rpm).

When the electrode mixture layer composition is obtained as a wet powder, it is preferably kneaded with a planetary mixer, twin-screw kneader or the like to obtain a uniform state without concentration irregularities.

(Non-Aqueous Electrolyte Secondary Battery Electrode)

The non-aqueous electrolyte secondary battery electrode of the present teachings is provided with a mixture layer constituted of the electrode mixture layer composition on the surface of a collector such as a copper or aluminum collector. The mixture layer is formed by first coating the electrode mixture layer composition of the present teachings on the surface of the collector, and then drying to remove the water or other medium. The method of coating the mixture layer composition is not particularly limited, and a known method such as a doctor blade method, dipping, roll coating, comma coating, curtain coating, gravure coating or extrusion may be adopted. The drying may also be accomplished by a known method such as warm air blowing, pressure reduction, (far) infrared exposure or microwave irradiation.

The mixture layer obtained after drying is normally subjected to compression treatment with a metal press, roll press or the like. By compressing, the active material and the binder are brought into close contact with each other, and the strength of the mixture layer and the adhesion to the collector can be improved. Preferably compression reduces a thickness of the mixture layer to about 30% to 80% of a pre-compression thickness, and the thickness of the mixture layer after compression is normally about 4 to 200 µm.

(Nonaqueous Electrolyte Secondary Battery)

The nonaqueous electrolyte secondary battery of the teachings is explained here. The nonaqueous electrolyte secondary battery of the teachings is provided with the nonaqueous electrolyte secondary battery electrode of the teachings, together with a separator and a nonaqueous electrolyte solution.

The separator is disposed between the positive and negative electrodes of the battery, and serves to prevent short-circuits caused by contact between the electrodes and ensure ion conductivity by retaining the electrolyte solution. Preferably the separator is a microporous film with insulating properties, and has good ion permeability and mechanical strength. Specific materials that can be used include polyolefins such as polyethylene and polypropylene, and polytetrafluoroethylene and the like.

For the nonaqueous electrolyte solution, a known electrolyte solution commonly used in nonaqueous electrolyte secondary batteries can be used. Specific examples of the solvent include cyclic carbonates with high dielectric constants and good ability to dissolve electrolytes, such as propylene carbonate and ethylene carbonate, and linear carbonates with low viscosity, such as ethyl methyl carbonate, dimethyl carbonate and diethyl carbonate, and these may be used alone or as a mixed solvent. A lithium salt such as $LiPF_6$, $LiSbF_6$, $LiBF_4$, $LiClO_4$ or $LiAlO_4$ is dissolved in this solvent and used as the nonaqueous electrolyte solution.

The nonaqueous electrolyte secondary battery of the present invention can be obtained by winding or laminating the positive plate and negative plate with the separator between the two, and accommodating this in a case or the like.

EXAMPLES

The present teachings will be described in detail below based on examples. However, the present teachings are not limited by these examples. In the following, "parts" and "%" mean parts by weight and % by weight unless otherwise specified.

Manufacturing Example 1: Manufacture of Crosslinked Polymer R-1

A reaction vessel equipped with a stirring blade, a thermometer, a reflux condenser and a nitrogen introduction pipe was used for polymerization.

295 parts of methanol, 100 parts of acrylic acid (hereunder called "AA") and 0.42 parts of allyl methacrylate (Mitsubishi Gas Chemical Company, Inc., hereunder called "AMA") were loaded into the reaction vessel. Next, 18 parts of caustic soda flakes and 10 parts of ion-exchange water were added slowly under stirring so that internal temperature was maintained at 40° C. or less.

The reaction vessel was thoroughly purged with nitrogen, and heated to raise the internal temperature to 68° C. Once the internal temperature was confirmed to have stabilized at 68° C., 0.014 parts of 4,4'-azobiscyanovaleric acid (Otsuka Chemical Co., Ltd., product name "ACVA") were added as a polymerization initiator, and since white turbidity of the reaction solution was observed at this point, this was taken as the polymerization starting point. The polymerization reaction was continued with the external temperature (water bath temperature) adjusted so that the solvent was gently refluxed, an additional 0.07 parts of ACVA were added once 4 hours had elapsed since the polymerization starting point, and solvent reflux was then continued. Cooling of the reaction solution was initiated 8 hours after the polymerization starting point, and once the internal temperature had fallen to 30° C., 32 parts of caustic soda flakes were gradually added in such a way that the internal temperature did not exceed 50° C. Once addition of the caustic soda flakes was complete and the internal temperature had fallen to 30° C. or less, the polymerization reaction solution (polymer slurry) was filtered by suction filtration. The filtered polymer was washed with methanol in twice the amount of the polymerization reaction solution, and a filtrate cake was collected and vacuum dried for 6 hours at 100° C. to obtain a crosslinked polymer R-1 in powder form. The crosslinked polymer R-1 had a degree of neutralization of 90 mol %. Because the crosslinked polymer R-1 was hygroscopic, it was stored and sealed in a container having water vapor barrier properties.

Manufacturing Examples 2 to 9: Manufacture of Crosslinked Polymers R-2 to R-9

The crosslinked polymers R-2 to R-9 were obtained in powder form by the same procedures as in Manufacturing Example 1 except that the amounts of the starting materials were as shown in Table 1.

TABLE 1

| | Manufacturing Example (ME) No. Crosslinked polymer | | ME 1 R-1 | ME 2 R-2 | ME 3 R-3 | ME 4 R-4 | ME 5 R-5 | ME 6 R-6 | ME 7 R-7 | ME 8 R-8 | ME 9 R-9 |
|---|---|---|---|---|---|---|---|---|---|---|---|
| (Parts) loaded | Monomer | AA | 100 | 100 | 100 | 100 | 100 | 70 | 100 | 100 | 100 |
| | | AAM | | | | | | 30 | | | |
| | Crosslinking agent | AMA | 0.42 | 0.30 | 0.47 | 0.30 | 1.12 | 0.30 | | | 220 |
| | | P-30 | | 0.70 | 1.50 | | | 0.70 | 0.70 | | |
| | | T-20 | | | | 1.40 | | | | 1.10 | |
| | Initial NaOH flakes | | 18.0 | 18.0 | 18.0 | 18.0 | 18.0 | 18.0 | 18.0 | 18.0 | 18.0 |
| | Ion-exchange water | | 10.0 | 10.0 | 10.0 | 10.0 | 10.0 | 10.0 | 10.0 | 10.0 | 10.0 |
| | Methanol | | 295.0 | 295.0 | 295.0 | 295.0 | 295.0 | 295.0 | 295.0 | 295.0 | 295.0 |
| | Polymerization initiator ACVA | Initial | 0.014 | 0.014 | 0.014 | 0.014 | 0.014 | 0.014 | 0.014 | 0.014 | 0.014 |
| | | Additional | 0.070 | 0.070 | 0.070 | 0.070 | 0.070 | 0.070 | 0.070 | 0.070 | 0.070 |

TABLE 1-continued

| Manufacturing Example (ME) No. | ME 1 | ME 2 | ME 3 | ME 4 | ME 5 | ME 6 | ME 7 | ME 8 | ME 9 |
|---|---|---|---|---|---|---|---|---|---|
| Crosslinked polymer | R-1 | R-2 | R-3 | R-4 | R-5 | R-6 | R-7 | R-8 | R-9 |
| Additional NaOH flakes | 32.0 | 32.0 | 32.0 | 32.0 | 32.0 | 17.0 | 32.0 | 32.0 | 32.0 |
| Initial monomer concentration (% by weight) | 23.6% | 23.6% | 23.5% | 23.5% | 23.6% | 23.6% | 23.6% | 23.6% | 23.5% |
| Crosslinking agent (mol %) to monomers | 0.240% | 0.368% | 0.690% | 0.642% | 0.640% | 0.367% | 0.197% | 0.370% | 1.257% |
| Degree of neutralization (%) | 90.0% | 90.0% | 90.0% | 90.0% | 90.0% | 90.0% | 90.0% | 90.0% | 90.0% |

The compounds used in Table 1 are explained below in detail.

AA: Acrylic acid
AAM: Acrylamide
AMA: Allyl methacrylate
P-30: Pentaerythritol triallyl ether (Daiso Chemical Co., Ltd., product name "Neoallyl P-30")
T-20: Trimethylol propane diallyl ether (Daiso Chemical Co., Ltd., product name "Neoallyl T-20")
ACVA: 4,4'-azobiscyanovaleric acid (Otsuka Chemical Co., Ltd.)

Preparation and Evaluation of Nonaqueous Electrolyte Secondary Battery Electrode Example 1-1

The coating properties of a mixture layer composition using graphite as the negative electrode active material and the crosslinked polymer R-1 as the binder were measured, as was the peeling strength between the formed mixture layer and a collector (that is, the binding properties of the binder).

100 parts of artificial graphite (Nippon Graphite Industries, Co., Ltd., product name "CGB-10") and 3 parts of the crosslinked polymer R-1 in powder form were thoroughly mixed in advance, after which 126 parts of ion-exchange water were added, and the mixture was pre-dispersed with a disperser and then dispersed for 15 seconds at a peripheral speed of 20 m/second with a thin film swirling mixer (Primix Corporation, FM-56-30) to obtain a negative electrode mixture layer composition in slurry form.

Using a variable applicator, this mixture layer composition was coated onto a 20 μm-thick copper foil (Nippon Foil Mfg. Co., Ltd.) so that the dried and pressed film thickness was 50 μm, and then immediately dried for 10 minutes at 100° C. in a ventilating dryer to form a mixture layer. The external appearance of the resulting mixture layer was observed with the naked eye, and the coating properties were evaluated according to the following standard and judged as good "A".

(Coating Property Evaluation Standard)
A: No streaks, spots or other appearance defects observed on surface
B: Slight streaks, spots or other appearance defects observed on surface
C: Obvious streaks, spots or other appearance defects observed on surface (90° Peel Strength (Binding Ability))

The mixture layer density was adjusted with a roll press to 1.7±0.05 g/cm$^3$ to prepare an electrode, which was then cut into a 25 mm-wide strip to prepare a sample for peel testing. The mixture layer side of this sample was affixed to a horizontally fixed double-sided tape and peeled at 90° at a rate of 50 mm/minute, and the peel strength between the mixture layer and the copper foil was measured. The peel strength was as high as 6.0 N/m, exhibiting a favorable strength.

In general, when an electrode is cut, worked and assembled into a battery cell, the peel strength of at least 1.0 N/m is necessary to prevent the problem of detachment of the mixture layer from the collector (copper foil). The high peel strength in this case means that the binder provides excellent binding between the active materials and between the active material and the electrode, and suggests that it is possible to obtain a battery with excellent durability and little loss of capacity during charge-discharge cycle testing.

Examples 1-2 to 1-9 and Comparative Examples 1-1 to 1-4

Mixture layer compositions were prepared by the same procedures as in Example 1-1 except that the crosslinked polymers used as binders were as shown in Tables 2 and 3, and the coating properties and 90° peeling strengths were evaluated. The results are shown in Tables 2 and 3.

TABLE 2

| | | | Example 1-1 | Example 1-2 | Example 1-3 | Example 1-4 | Example 1-5 | Example 1-6 | Example 1-7 | Example 1-8 | Example 1-9 |
|---|---|---|---|---|---|---|---|---|---|---|---|
| Mixture layer composition (parts) | Active material | CGB-10 | 100 | 100 | 100 | 100 | 100 | 100 | 100 | 100 | 100 |
| | Crosslinked polymer | R-1 | 3.0 | | | | | | | | |
| | | R-2 | | 3.0 | | | | | | | |
| | | R-3 | | | 3.0 | | | | | | |
| | | R-4 | | | | 3.0 | | | | 1.0 | 4.0 |
| | | R-5 | | | | | 3.0 | | 1.0 | | |
| | | R-6 | | | | | | 3.0 | | | |
| | | R-7 | | | | | | | | | |
| | | R-8 | | | | | | | | | |
| | | R-9 | | | | | | | | | |
| | Ion-exchange Water | | 126 | 126 | 126 | 126 | 126 | 126 | 109 | 109 | 156 |
| | Total | | 229 | 229 | 229 | 229 | 229 | 229 | 210 | 210 | 260 |
| | Solids concentration | (%) | 45.0% | 45.0% | 45.0% | 45.0% | 45.0% | 45.0% | 48.0% | 48.0% | 40.0% |
| Degree of neutralization of polymer powder | | (%) | 90.0% | 90.0% | 90.0% | 90.0% | 90.0% | 90.0% | 90.0% | 90.0% | 90.0% |
| Coating properties of slurry | | | A | A | B | A | B | A | B | A | A |
| 90° peeling strength (N/m) | | | 6.0 | 8.2 | 12.4 | 9.8 | 5.8 | 7.1 | 1.2 | 2.4 | 16.3 |

TABLE 3

|  |  |  | Comparative Example 1-1 | Comparative Example 1-2 | Comparative Example 1-3 | Comparative Example 1-4 |
|---|---|---|---|---|---|---|
| Mixture layer composition (parts) | Active material CGB-10 |  | 100 | 100 | 100 | 100 |
|  | Crosslinked polymer | R-1 |  |  |  |  |
|  |  | R-2 |  |  |  |  |
|  |  | R-3 |  |  |  |  |
|  |  | R-4 |  |  |  | 0.3 |
|  |  | R-5 |  |  |  |  |
|  |  | R-6 |  |  |  |  |
|  |  | R-7 | 3.0 |  |  |  |
|  |  | R-8 |  | 3.0 |  |  |
|  |  | R-9 |  |  | 3.0 |  |
|  | Ion-exchange water |  | 126 | 126 | 126 | 100 |
|  | Total |  | 229 | 229 | 229 | 201 |
|  | Solids concentration | (%) | 45.0% | 45.0% | 45.0% | 50.0% |
| Degree of neutralization of polymer powder | | (%) | 90.0% | 90.0% | 90.0% | 90.0% |
| Coating properties of slurry | | | C | C | C | C |
| 90° peeling strength (N/m) | | | 0.7 | 1.0 | 4.2 | — |

In Examples 1-1 to 1-9, electrodes were prepared using electrode mixture layer compositions for nonaqueous electrolyte secondary batteries according to the present teachings. Each composition (slurry) had good coating properties, and the peeling strength between the resulting mixture layer and a collector (copper foil) was at least 1.0 N/m in all cases, indicating excellent binding properties. As for comparison between the examples, although the degree of crosslinking of the crosslinked polymer was roughly the same in Example 1-4 as in Example 1-5 and was also roughly the same in Example 1-7 as in Example 1-8, the coating properties and binding properties were greater in Examples 1-4 and 1-8, both of which used the crosslinked polymer R-4, which combines a polyfunctional allyl compound and allyl methacrylate as crosslinking monomers. When these are combined, a crosslinked polymer is obtained with a suitable degree of crosslinking, and it is expected that the microgel will exhibit good swelling and strength, and an excellent dispersion stabilization effect will be obtained.

By contrast, the coating properties and binding properties were insufficient in Comparative Examples 1-1 and 1-2 using crosslinked polymers that do not employ allyl methacrylate as a crosslinking monomer. It is hypothesized that in these cases, no dispersion stabilization effect was obtained because the microgel was insufficiently strong due to the insufficient degree of crosslinking. The coating properties were poor in Comparative Example 1-3, in which more allyl methacrylate was used. It is hypothesized that no dispersion stabilization effect was obtained in this case because the water-swelling properties of the microgel were inadequate due to excessive crosslinking. Moreover, in Comparative Example 1-4 in which the compounded amount of the crosslinked polymer was smaller relative to the active material, the mixture layer exhibited almost no binding properties, and peeling strength could not be measured because the mixture layer peeled off when the electrode was cut to prepare a sample for the peel test.

Example 2-1

A lithium-ion secondary battery was prepared using a mixture layer composition containing hard carbon as a negative electrode material, acetylene black as a conductive aid and the crosslinked polymer R-1 as a binder, and the battery characteristics were evaluated.

100 parts of hard carbon (Sumitomo Bakelite Co., Ltd., product name "LBV-1001"), 2 parts of acetylene black (Denki Kagaku Kogyo K.K., product name "HS-100") and 3 parts of the crosslinked polymer R-1 in powder form were thoroughly mixed in advance, after which 132 parts of ion-exchange water were added, and the mixture was pre-dispersed with a disperser and then dispersed for 15 seconds at a peripheral speed of 20 m/second with a thin film swirling mixer (Primix Corporation, FM-56-30) to obtain a negative electrode mixture layer composition in slurry form.

Using a direct coating-type coating device with a drying furnace, this mixture layer composition was coated on both sides of a 20 μm-thick copper foil (Nippon Foil Mfg. Co., Ltd.) as collector with a coating width of 120 mm, dried, and roll pressed to prepare a negative electrode comprising mixture layers on both sides of the collector. The adhering amount of the mixture layer was 4.96 mg/cm$^2$ (per side), and the density was 1.0 g/cm$^3$.

A 15 μm-thick aluminum foil collector (Nippon Foil Mfg. Co., Ltd.) having mixture layers constituted of a mixture layer composition containing NCM (Nippon Chemical Industrial Co., Ltd.) as an active material, HS-100 as a conductive aid and polyvinylidene fluoride (Kureha Corporation, product name "KF #1000") in proportions of 85.5/4.5/10 (by weight) on both sides of the foil was used as the positive electrode. The adhering amount of the positive electrode mixture layer was 6.80 mg/cm$^2$ (per side), and the density was 2.78 g/cm$^3$.

Both the positive and negative electrodes were vacuum dried for 12 hours at 120° C., and slit to 96×84 mm in a case of the positive electrode and 100×88 mm in a case of the negative electrode. The slit electrodes (7 positive electrodes, 8 negative electrodes) were layered with polyethylene separators between the layers, to assemble a laminate cell. The laminate cell was sealed on three sides, vacuum dried for 5 hours at 60° C., injected with electrolyte solution (1 M, LiPF6 in EC/EMC=3/7 (v/v)), and vacuum sealed. All laminate cell preparation was performed in a dry room.

The battery characteristics of the laminate cell prepared above were evaluated as follows.

(Initial Charge/Discharge Evaluation)

The initial charge-discharge capacity was measured under the following conditions using an SD8 charge/discharge system (Hokuto Denko Corporation).

During measurement, one charge/discharge cycle was performed first to stabilize the battery conditions, after which a second charge/discharge cycle was performed, and it was confirmed that the charge/discharge capacity had stabilized within the design capacity (700 to 800 mAh).

Measurement temperature: 25° C.
Charge: 0.1 C-CC/Cut-off 4.2 V⇒CV/terminal rate 0.01 C
Discharge: 0.1 C-CC/Cut-off 3.0 V
2 cycles In the first cycle the charge capacity was 1142 mAh and the discharge capacity was 769 mAh, while in the second cycle the charge capacity was 778 mAh and the discharge capacity was 755 mAh.

(Low-Temperature Rate Test and AC Impedance Measurement)

A cell that had undergone initial charge/discharge testing was subjected to low-temperature rate testing and AC impedance measurement under the following conditions and order. An SD8 charge/discharge system (Hokuto Denko Corporation) and a VSP impedance measurement system (Bio-Logic Science Instruments) were used for measurement.

Measurement temperature: −15° C.
(1) 0.1 C charge/discharge (low-temperature initial charge/discharge)
Charge: 0.1 C-CC/Cut-off 4.2 V
(pause time 10 minutes)
Discharge: 0.1 C-CC/Cut-off 3.0 V
(2) AC impedance measurement
Charge: 0.1 C, 2 hours
Applied voltage: 10 mV
Frequency: 1,000 kHz to 10 mHz
(residual discharge treatment 0.1 C to 3V)
(3) 0.5 C charge/discharge
Charge: 0.5 C-CC/Cut-off 4.2 V
(pause time 10 minutes)
Discharge: 0.5 C-CC/Cut off 3.0 V
(residual discharge treatment 0.1 C to 3 V)
(4) 1 C charge/discharge
Charge: 1 C-CC/Cut-off 4.2 V
(pause time 10 minutes)
Discharge: 1 C-CC/Cut-off 3.0 V
(residual discharge treatment 0.1 C to 3 V)
(5) 2 C charge/discharge
Charge: 2 C-CC/Cut-off 4.2 V
(pause time 10 minutes)
Discharge: 2 C-CC/Cut-off 3.0 V
(residual discharge treatment 0.1 C to 3 V)
(6) 3 C charge/discharge
Charge: 3 C-CC/Cut-off 4.2 V
(pause time 10 minutes)
Discharge: 3 C-CC/Cut-off 3.0 V
(residual discharge treatment 0.1 C to 3 V)
(7) 4 C charge/discharge
Charge: 4 C-CC/Cut-off 4.2 V
(pause time 10 minutes)
Discharge: 4 C-CC/Cut-off 3.0 V
(residual discharge treatment 0.1 C to 3 V)

The measurement results of (1) above were low-temperature initial charge/discharge capacity 605 mAh, discharge capacity 598 mAh.

When a Nyquist plot was prepared from the measurement results of (2) above, the interface resistance value as estimated from the size of the arc was 0.38Ω.

The discharge capacities obtained from (3) to (7) above, were divided by the discharge capacity obtained in (1) above to calculate the discharge capacity retention rate at each C-rate, which was 0.5 C: 67%, 1 C: 44%, 2 C: 15%, 3 C: 3%, 4 C: 0%. 0% here means that the Cut-off voltage (3.0 V) has reached immediately after the start of discharge due to a voltage drop caused by overvoltage.

(Cycle Test)
A cell that had undergone initial charge/discharge testing was subjected to cycle testing under the following conditions.
Measurement temperature: 25° C.
Charge: 1 C-CC/Cut-off 4.2 V
Discharge: 1 C-CC/Cut-off 3.0 V
200 cycles The discharge capacity of the 200th cycle was divided by the discharge capacity of the first cycle to calculate the 200-cycle discharge capacity retention rate, which was 93%.

Examples 2-2 to 2-4 and Comparative Examples 2-1 to 2-3

Laminate cells were assembled by the same operations as in Example 2-1 except that the crosslinked polymers used as binders were as shown in Table 4, and the battery characteristics were evaluated. The results are shown in Table 4.

In Comparative Example 2-3, the styrene-butadiene rubber (SBR) and carboxymethyl cellulose (CMC) shown below were used as binders.

SBR: JSR Corporation, product name "TRD2001", 1.5 parts as solids
CMC: Daicel FineChem Ltd., product name "CMC2200", 1.5 parts as solids

TABLE 4

| | | Example 2-1 | Example 2-2 | Example 2-3 | Example 2-4 | Comparative Example 2-1 | Comparative Example 2-2 | Comparative Example 2-3 |
|---|---|---|---|---|---|---|---|---|
| Negative electrode mixture layer composition | LBV-1001 (parts) | 100 | 100 | 100 | 100 | 100 | 100 | 100 |
| | HS-100 (parts) | 2 | 2 | 2 | 2 | 2 | 2 | 2 |
| | Crosslinked polymer type | R-1 | R-4 | R-4 | R-4 | R-4 | R-9 | SBR/CMC |
| | (parts) | 3.0 | 1.0 | 3.0 | 4.0 | 6.0 | 3.0 | 3.0 |
| | Ion-exchange water (parts) | 128 | 126 | 128 | 140 | 162 | 128 | 128 |
| | Total | 233 | 229 | 233 | 246 | 270 | 233 | 233 |
| | Solids concentration (%) | 45.1% | 45.0% | 45.1% | 43.1% | 40.0% | 45.1% | 45.1% |
| Degree of neutralization of crosslinked polymer (%) | | 90.0% | 90.0% | 90.0% | 90.0% | 90.0% | 90.0% | — |
| First cycle charge capacity (mAh) | | 1,142 | 1,174 | 1,149 | 1,136 | 1,114 | 1,143 | 1,165 |
| First cycle discharge capacity (mAh) | | 769 | 789 | 772 | 762 | 749 | 768 | 769 |
| Second cycle charge capacity (mAh) | | 778 | 796 | 781 | 773 | 758 | 773 | 784 |
| Second cycle discharge capacity (mAh) | | 755 | 774 | 758 | 751 | 737 | 752 | 758 |

TABLE 4-continued

|  | | Example 2-1 | Example 2-2 | Example 2-3 | Example 2-4 | Comparative Example 2-1 | Comparative Example 2-2 | Comparative Example 2-3 |
|---|---|---|---|---|---|---|---|---|
| Interface resistance value (Ω) | | 0.38 | 0.24 | 0.33 | 0.38 | 0.64 | 0.40 | 0.61 |
| Low-temperature initial charge capacity (mAh) (0.1 C.) | | 605 | 630 | 615 | 607 | 595 | 602 | 609 |
| Low-temperature initial discharge capacity (mAh) (0.1 C.) | | 598 | 621 | 606 | 599 | 588 | 596 | 599 |
| Low-temperature rate test | 0.5 C. | 67% | 75% | 71% | 68% | 63% | 61% | 64% |
| Discharge capacity retention rate | 1.0 C. | 44% | 58% | 50% | 44% | 33% | 38% | 39% |
| (% of 0.1 C.) | 2.0 C. | 15% | 31% | 24% | 14% | 4% | 5% | 8% |
|  | 3.0 C. | 3% | 19% | 10% | 2% | 0% | 0% | 0% |
|  | 4.0 C. | 0% | 5% | 1% | 0% | 0% | 0% | 0% |
| Cycle test (1C., 200 cycles) discharge capacity retention rate (%) | | 93% | 93% | 95% | 94% | 94% | 79% | 92% |

The compounds used in Table 4 are specified here.
LBV-1001: Hard carbon (Sumitomo Bakelite Co., Ltd.)
HS-100: Acetylene black (Denki Kagaku Kogyo K.K.)

In Examples 2-1 to 2-4 pertaining to the nonaqueous electrolyte secondary battery of the teachings, the discharge capacity retention rate after cycle testing was 93% to 95%, indicating excellent cycle characteristics. All these examples also exhibited good high-rate characteristics. It is thought that this is because, due to the characteristics of the crosslinked polymers used, the interface resistance values are reduced and electronic resistance is reduced due to favorable homogeneous dispersion of active materials and conductive aids, thereby reducing the internal resistance of the battery. In particular, comparing Examples 2-1 and 2-3, in which the amount of the crosslinked polymer is the same, the discharge capacity retention rate was higher at high current densities and the high-rate characteristics were better in Example 2-3, which used the crosslinked polymer R-4 having a particularly good dispersion stabilizing effect.

By contrast, the cycle characteristics were low—79%—in Comparative Example 2-2, which used the crosslinked polymer R-9 with no allyl methacrylate as a crosslinking monomer. In Comparative Example 2-3 using SBR and CMC as binders, the high-rate characteristics are poorer than in the examples. In Comparative Example 2-3, it is believed that the interface resistance increased because the binder did not have sufficient carboxyl groups, and the high rate characteristics declined as a result. The high-rate characteristics were also unsatisfactory in Comparative Example 2-1, in which the content of the crosslinked polymer was high.

INDUSTRIAL APPLICABILITY

An electrode obtained from the electrode mixture layer composition for a nonaqueous electrolyte secondary battery of the teachings has an excellent binding force and exhibits the effect of reduced battery resistance as well. As a consequence, a nonaqueous electrolyte secondary battery equipped with this electrode exhibits superior high-rate characteristics and durability (cycle characteristics), and can be applied to vehicular secondary batteries.

The invention claimed is:

1. An electrode mixture layer composition for a nonaqueous electrolyte secondary battery, containing an active material, water and a binder, wherein
the binder contains a crosslinked polymer of a monomer component including an ethylenically unsaturated carboxylic acid monomer, or a salt of the crosslinked polymer,
the crosslinked polymer is a polymer that is crosslinked with allyl methacrylate, and an amount of the allyl methacrylate used is 0.1 to 2.0 parts by weight relative to total 100 parts by weight of non-crosslinking monomers,
a content of the crosslinked polymer or the salt thereof is 0.5% to 5.0% by weight of the active material, and
a ratio of the ethylenically unsaturated carboxylic acid monomer of a total amount of the non-crosslinking monomers is in a range of 50% to 100% by weight.

2. The electrode mixture layer composition for a nonaqueous electrolyte secondary battery according to claim 1, wherein the crosslinked polymer is a polymer that is crosslinked with allyl methacrylate and a polyfunctional allyl compound, and an amount of the allyl methacrylate and polyfunctional allyl compound is 0.1 to 3.0 parts by weight relative to total 100 parts by weight of the non-crosslinking monomers.

3. The electrode mixture layer composition for a nonaqueous electrolyte secondary battery according to claim 1, wherein a degree of neutralization of the crosslinked polymer is 20 to 100 mol %.

4. A method of manufacturing an electrode mixture layer composition for a nonaqueous electrolyte secondary battery, the method comprising:
precipitation-polymerizing a monomer component including an ethylenically unsaturated carboxylic acid monomer and allyl methacrylate in an aqueous medium to obtain a crosslinked polymer; and
mixing an active material, the crosslinked polymer or a salt of the crosslinked polymer in an amount of 0.5% to 5.0% by weight relative to the active material and water to thereby manufacture an electrode mixture layer composition for a nonaqueous electrolyte secondary battery,
wherein the monomer component contains the ethylenically unsaturated carboxylic acid monomer in a range of 50% to 100% by weight of non-crosslinking monomers which are included in the monomer component and the allyl methacrylate in an amount of 0.1 to 2.0 parts by weight relative to total 100 parts by weight of the non-crosslinking monomers.

5. A nonaqueous electrolyte secondary battery electrode comprising a mixture layer constituted of the electrode mixture layer composition for a nonaqueous electrolyte secondary battery according to claim 1 on a surface of a collector.

6. A nonaqueous electrolyte secondary battery comprising: the nonaqueous electrolyte secondary battery electrode according to claim 5; a separator; and a nonaqueous electrolyte solution.

7. The electrode mixture layer composition for a nonaqueous electrolyte secondary battery according to claim 2, wherein a degree of neutralization of the crosslinked polymer is 20 to 100 mol %.

8. A nonaqueous electrolyte secondary battery electrode comprising a mixture layer constituted of the electrode mixture layer composition for a nonaqueous electrolyte secondary battery according to claim 2 on a surface of a collector.

9. A nonaqueous electrolyte secondary battery electrode comprising a mixture layer constituted of the electrode mixture layer composition for a nonaqueous electrolyte secondary battery according to claim 3 on a surface of a collector.

10. A nonaqueous electrolyte secondary battery electrode comprising a mixture layer constituted of the electrode mixture layer composition for a nonaqueous electrolyte secondary battery according to claim 7 on a surface of a collector.

11. A nonaqueous electrolyte secondary battery comprising: the nonaqueous electrolyte secondary battery electrode according to claim 8; a separator; and a nonaqueous electrolyte solution.

12. A nonaqueous electrolyte secondary battery comprising: the nonaqueous electrolyte secondary battery electrode according to claim 9; a separator; and a nonaqueous electrolyte solution.

13. A nonaqueous electrolyte secondary battery comprising: the nonaqueous electrolyte secondary battery electrode according to claim 10; a separator; and a nonaqueous electrolyte solution.

14. A binder for a nonaqueous electrolyte secondary battery comprising:

a crosslinked polymer of a monomer component including an ethylenically unsaturated carboxylic acid monomer or a salt of the crosslinked polymer, the crosslinked polymer being a polymer that is crosslinked with allyl methacrylate in an amount of 0.1 to 2.0 parts by weight relative to total 100 parts by weight of non-crosslinking monomers which are included in the monomer component, and a ratio of the ethylenically unsaturated carboxylic acid monomer to the total amount of non-crosslinking monomers being in a range of 50% to 100% by weight.

15. The binder according to claim 14, wherein the range is 70% to 100% by weight.

* * * * *